United States Patent [19]
Numata et al.

[11] 3,956,758
[45] May 11, 1976

[54] WARNING DEVICE FOR PHOTOGRAPHIC CAMERAS

[75] Inventors: Saburo Numata, Urawa; Iwao Sagara, Higashikurume; Hirohisa Shishikura, Kodaira, all of Japan

[73] Assignees: Fuji Photo Optical Co., Ltd., Omiua; Oki Electric Industry Company, Ltd., Tokyo, both of Japan

[22] Filed: July 29, 1974

[21] Appl. No.: 492,879

[30] Foreign Application Priority Data
July 28, 1973 Japan.............................. 48-85169

[52] U.S. Cl. ................................. 354/53; 354/60 L
[51] Int. Cl.² ........................................ G03B 17/20
[58] Field of Search............. 354/230, 60 L, 53, 54, 354/55, 56

[56] References Cited
UNITED STATES PATENTS
3,843,249   10/1974   Kitaura ............................ 354/23 D

*Primary Examiner*—Monroe H. Hayes

[57] ABSTRACT

An exposure indicating means comprising a plurality of light emitting elements which are selectively energized to indicate exposure information in a digital form is connected with an exposure measuring circuit. The light emitting elements are connected with a warning circuit. The warning circuit comprises a warning signal generator which generates a warning signal when a warning is required, a square wave generator which constantly generates a square wave and an AND circuit which transmits the square wave to the light emitting elements when the warning signal is transmitted thereto. The light emitting elements are intermittently turned off by the square wave coming from the AND circuit. The frequency of the square wave is selected so that the intermittent turning off of the light emitting elements is sensed by the photographer viewing through the viewfinder of the camera.

8 Claims, 5 Drawing Figures

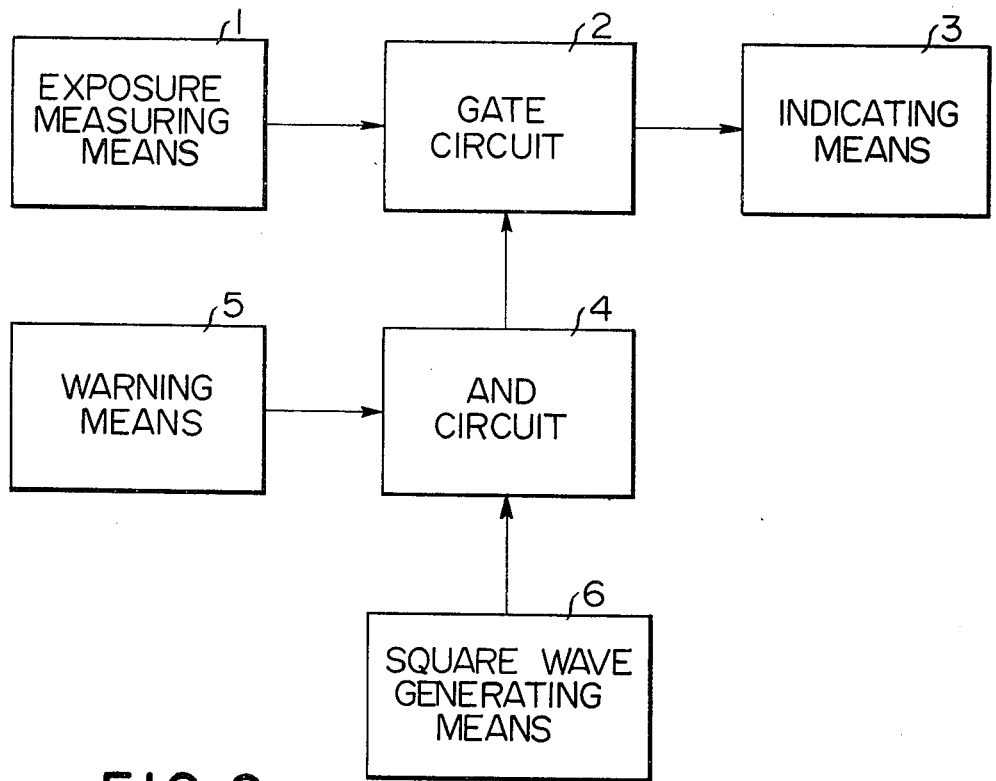
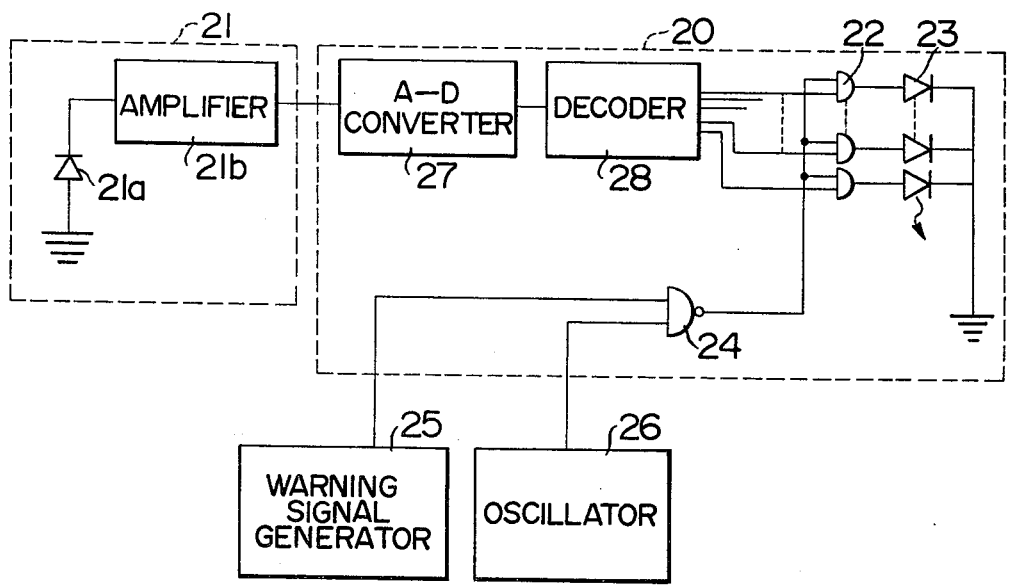

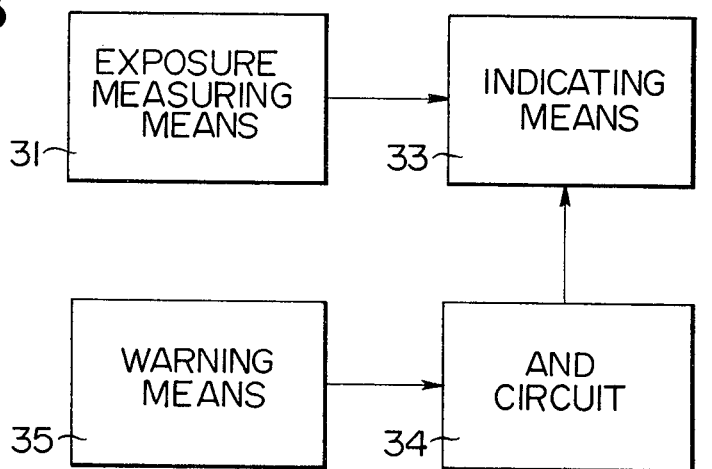
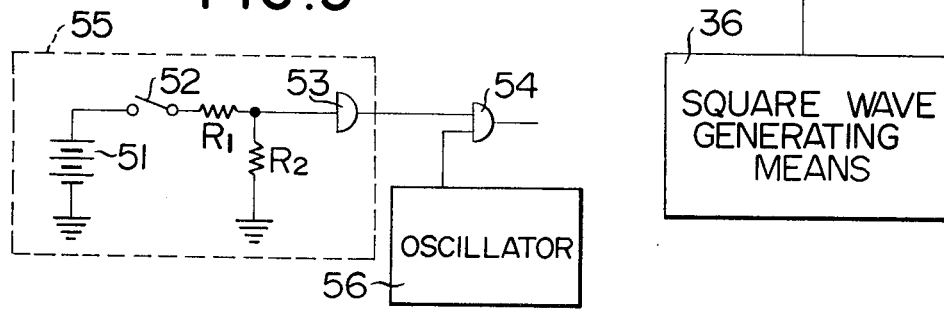
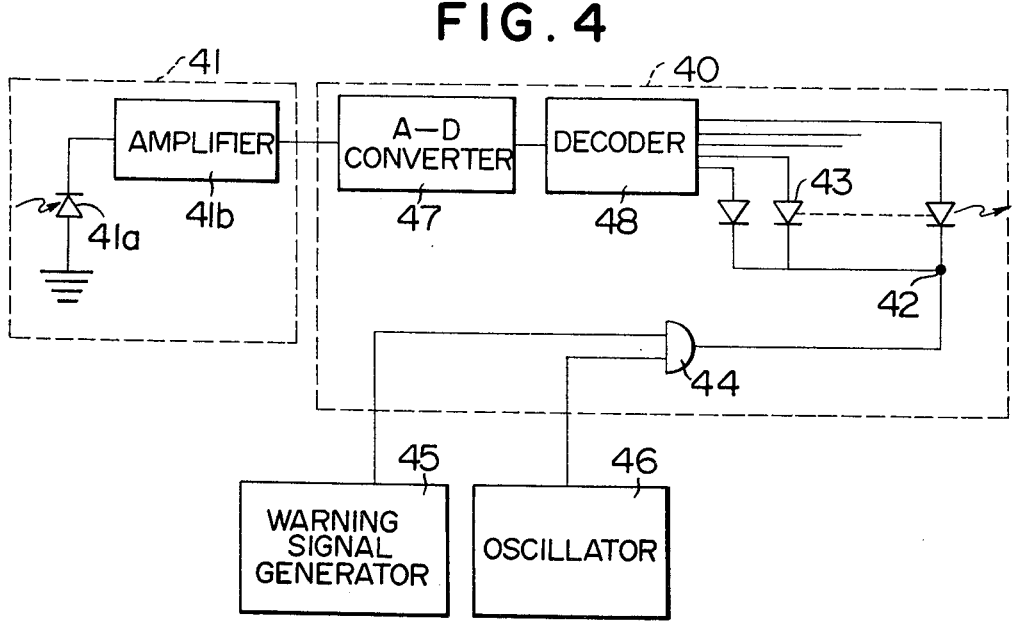

WARNING DEVICE FOR PHOTOGRAPHIC CAMERAS

BACKGROUND OF THE INVENTION

1. Field of the Invention

This invention relates to a warning device in a camera, and more particularly to a device for indicating a warning signal in the viewfinder of a camera. This warning device is particularly applicable to a photographic camera in which exposure information is indicated in the viewfinder by use of electrically operated light emitting elements such as light emitting diodes. The light emitting elements serving as the exposure information indicating means are also used to indicate a warning signal.

2. Description of the Prior Art

In photographic cameras provided with automatic exposure control means, there is a demand for a warning device which indicates that, for instance, the power source lacks sufficient voltage, the shutter speed automatically controlled is too slow to take a sharp photograph, the brightness of the object is beyond the range of automatic exposure control, film has not been loaded, a flash light must be used and so forth.

In the conventional photographic cameras provided with automatic exposure control means, it is known to indicate the actually controlled shutter speed or diaphragm hole size in the visual field of the viewfinder. As for the indicating means provided in the viewfinder of the camera, various kinds of light emitting elements such as electric lamps and light emitting diodes have been proposed and are used.

Since the above described exposure information indicating means including light emitting elements located in the viewfinder and a control means for electrically controlling the light emitting elements has a complicated construction and must be provided in a small space around the viewfinder, the construction of the camera is considerably complicated thereby. Therefore, from the viewpoint of the manufacture of cameras, it is extremely difficult to provide a warning device in addition to the exposure information indicating means in the vicinity of the viewfinder.

Furthermore, in the technique of digital indication using light emitting diodes and the like, the number of pins extending from the digital light emitting elements should preferably be as small as possible from the viewpoint of manufacturing cost. Accordingly, in the conventional cameras including this kind of digital exposure information indicating means, an ordinary lamp is used for indicating a warning signal.

SUMMARY OF THE INVENTION

In the light of the foregoing observations and description of the conventional exposure information indicating means and warning devices, the primary object of the present invention is to provide a warning device for indicating a warning signal in the viewfinder of a camera which uses the light emitting elements used also as the exposure information indicating means.

Another object of the present invention is to provide a warning device for indicating a warning signal in the viewfinder of a camera in which light emitting elements provided in the viewfinder are operated to indicate both a warning signal and exposure information, and in which means for operating the light emitting elements electrically connected therewith is very simple in construction.

The warning device in accordance with the present invention comprises an oscillator which generates a square wave, a warning signal generating means and a logical multiplying circuit (AND circuit) connected with the oscillator and the warning signal generating means. The AND circuit is connected with light emitting elements of an exposure information indicating means provided in the viewfinder and gives a square wave to the light emitting elements when it receives a warning signal from said warning signal generating means. The square wave transmitted to the light emitting elements intermittently deenergizes the light emitting elements and this intermittent deenergization serves as warning to the photographer viewing through the viewfinder.

BRIEF DESCRIPTION OF THE DRAWING

FIG. 1 is a simplified block diagram which shows the basic construction of the warning device in accordance with a first embodiment of the present invention, FIG. 2 is a block diagram which shows the construction of the warning device in accordance with the first embodiment of the present invention, FIG. 3 is a simplified block diagram which shows the basic construction of the warning device in accordance with a second embodiment of the invention, FIG. 4 is a block diagram which shows the construction of the warning device in accordance with the second embodiment of the invention, and FIG. 5 is a circuit view showing an example of a warning device employed in this invention.

DESCRIPTION OF THE PREFERRED EMBODIMENTS

The basic construction of a first embodiment of the warning device connected with an exposure indicating means is illustrated in FIG. 1. Referring to FIG. 1, an exposure measuring means 1 including a photodetector such as a CdS element which receives light from the object to be photographed and generates an analogue output corresponding to the amount of light received thereby is connected with an exposure information indicating means 3 through a gate circuit 2 which transmits the output from the exposure measuring means 1 to the exposure information indicating means 3. The exposure information indicating means 3 includes light emitting elements such as electric lamps or light emitting diodes for indicating exposure information such as shutter speed or diaphragm hole size. A warning signal generating means 5 and a square wave generating means 6 such as an oscillator are connected with a logical multiplying circuit (AND circuit) 4 which in turn is connected with the gate circuit 2. When a warning signal is transmitted to the AND circuit 4 from the warning means 5, the AND circuit 4 operates to transmit the square wave from the square wave generating means 6 to the gate circuit 2 so as to turn the gate circuit 2 ON and OFF at the intervals corresponding to the period of the square wave. By the intermittent turning OFF of the gate circuit 2, the light emitting elements in the exposure information indicating means are intermittently deenergized. The frequency of the square wave is so selected that the intermittent deenergization of the light emitting elements provided in the viewfinder may be noticed by the photographer. Theoretically, the frequency of the square wave should be so selected that the period, i.e. the reciprocal of the frequency, of the square wave is not less than 0.05 second which is the image retention period of the human eye. Accordingly, although the period of the square wave may be as long as about 0.1 second, practically it should preferably be 0.5 to 1.0 second so that the intermittent deenergization of the light emitting elements may be clearly noticed by the photographer.

Now referring to FIG. 2 showing the first embodiment of the warning device in accordance with the present invention, an exposure measuring circuit 21 comprises a photodetector 21a such as a silicon photocell or a cadmium sulfide element which receives light from the object to be photographed and an amplifier 21b connected therewith to amplify the analogue output thereof, and generates an analogue output corresponding to the brightness of the object. A digital information indicating circuit 20 is connected with the exposure measuring circuit 21. The digital information indicating circuit 20 comprises an A-D converter 27 connected with the amplifier 21b for converting the analogue output from the amplifier 21b to a digital signal, a plurality of light emitting diodes 23 arranged in a digital form to indicate digital information, a plurality of gate circuits 22 connected with the light emitting diodes 23 respectively to control the light emitting diodes 23, a decoder 28 connected between the A-D converter 27 and the gate circuits 22 for selectively energizing the light emitting diodes 23 to indicate digital information therewith in accordance with the digital input given thereto by the A-D converter 27, and a logical multiplying circuit 24 such as an AND circuit or a NAND circuit connected with the gate circuits 22. In this embodiment, the gate circuits 22 are normally opened AND circuits and the logical multiplying circuit 24 is a NAND circuit. The NAND circuit 24 is connected with a warning signal generator 25 and an oscillator 26 which generates a square wave. The warning signal generator 25 generates a signal when a warning is required and transmits the signal to the gate circuit 24. The oscillator 26 constantly generates a square wave and transmits the square wave to the gate (NAND) circuit 24. The output level of the warning signal generator 25 is usually 0, and when a warning is required, the output level becomes 1. The output level of the oscillator 26 alternately becomes 0 and 1. Accordingly, when a warning signal is not generated from the warning signal generator 25, the logical multiplication of the NAND circuit 24 remains $\overline{0}$, that is 1. Consequently, the gate circuits 22 are kept in the open (ON) condition. The light emitting elements 23 are, therefore, constantly in the energized state. When a warning signal is generated by the generator 25, the logical multiplication of the NAND circuit 24 alternately becomes $\overline{1}$ and $\overline{0}$ (0 and 1), and accordingly, the gate circuits 22 are intermittently closed (turned OFF). Thus, the light emitting diodes 23 are intermittently turned off with intervals corresponding to said period of the square wave generated from the oscillator 26.

If the period of the square wave is set to be one second, the light emitting diodes 23 are turned off once every second. Since the light emitting diodes 23 are used to indicate exposure information and can be seen through the viewfinder, intermittent deenergization thereof is noticed by the photographer. Thus, the warning signal is indicated in the viewfinder by use of the light emitting diodes serving also as the exposure information indicating means. For example, the light emitting diodes 23 may be used to indicate the shutter speed actually controlled by the automatic exposure control means in the camera and also to indicate a power shortage. In such an example, in the first stage of the depression of the shutter button, a shutter speed, e.g. "250," is indicated in the viewfinder of the camera in a digital form by use of the light emitting diodes. This means that the shutter speed will be 1/250 second if the shutter release button is depressed further to release the shutter. If the light emitting diodes starts to be intermittently deenergized, the photographer can easily recognize that the power source voltage of the automatic exposure control means has become low.

A second embodiment of the present invention is shown in FIGS. 3 and 4 in which an AND circuit is directly connected with indicating means and no gate circuit is used. Referring to FIG. 3 which shows the basic construction of the warning device in accordance with the second embodiment, an exposure measuring means 31 including a photodetector is connected with an indicating means 33 which is directly connected with an AND circuit 34. The AND circuit 34 is connected with a warning means 35 and a square wave generating means 36 such as an oscillator, and transmits the square wave to the indicating means 33 when it receives a warning signal from the warning means 35. The second embodiment is illustrated in greater detail in FIG. 4. An exposure measuring circuit 41 including a photodetector 41a and an amplifier 41b is connected with an A-D converter 47 of an indicating circuit 40. In this respect the construction is similar to the first embodiment. A decoder 48 connected with light emitting diodes 43 is connected with the A-D converter 47 to selectively energize the diodes 43 to indicate in a digital form exposure information indicative of the analogue output from the exposure measuring circuit 41 in accordance with the digital output from the A-D converter 47. The light emitting diodes 43 are connected at one end thereof with said decoder 48 and at the other end thereof 42 with an AND circuit 44 which is connected with a warning signal generator 45 and an oscillator 46. The warning signal generator 45 generates a warning signal having an output level of 1 when a warning is required. When no warning signal is generated by the warning signal generator 45, the output level is constantly 0. The oscillator 46 generates a square wave having an output level alternating between 1 and 0. Therefore, the output of the AND circuit is normally 0 so that said end 42 of the light emitting diodes 43 is maintained at a potential of the level of 0. On the other hand, the other end of the light emitting diodes 43 connected with the decoder 48 is selectively raised to the level of 1 by the output of the decoder 48. Consequently, the light emitting diodes 43 are energized to indicate such exposure information as the shutter speed in a digital form. When a warning signal is generated by the warning signal generator 45 and a signal of the level 1 is transmitted to the AND circuit 44, the output of the AND circuit 44 becomes alternately 1 and 0. Consequently, the level of said end 42 of the light emitting diodes 43 is alternately changed between 1 and 0. Since the other end of the energized light emitting diodes 43 is constantly kept at the level of 1, the diodes 43 are deenergized when the level at said end 42 thereof is raised to 1 from 0. The interval of deenergization is equal to the period of the square wave generated from the oscillator 46. Thus, the light emitting diodes 43 energized to indicate exposure information in the viewfinder are intermittently deenergized when a warning signal is generated from the warning signal generator 45. By the intermittent deenergization of the light emitting diodes 43, a warning is given to the photographer.

As for the warning signal generating means 5, 25, 35 and 45, there can be used various kinds of electric signal generators capable of normally generating a signal of level 0 and of generating a warning signal of level 1 when a warning is required. The warning may be given to warn the photographer of various situations such as a power source shortage, film shortage, too slow a shutter speed, over- or under-exposure, and so forth. One example of the warning signal generating means will be described hereinbelow with reference to FIG. 5.

The warning signal generating means 55 shown in FIG. 5 is a circuit for generating a warning signal when the voltage of the power source becomes insufficient. A power source 51 is connected with a level detecting circuit 53 by way of an ON-OFF switch 52 and a dividing resistor R1. The dividing resistor R1 is connected with another dividing resistor R2 which is grounded. The ON-OFF switch 52 is associated, for instance, with a shutter release mechanism so that the switch 52 is closed when the shutter release button is depressed. The level detecting circuit 53 normally generates a signal of level 0 when the voltage of the power source 51 is sufficiently high, and generates a warning signal of level 1 when the voltage of the power source 51 falls below the required level of voltage. The level detecting circuit 53 may be an inverter which detects the fall of the power source voltage by the threshold level thereof and generates an output of level 1 when the voltage of the power source 51 falls close to or below the predetermined level. When the voltage of the power source 51 is sufficiently high, the output of the inverter is of level 0. The level detecting circuit 53 is connected with an AND circuit 54 which corresponds to said AND circuit 44 in the second embodiment shown in FIG. 4. An oscillator 56 is connected with the AND circuit 54 so that the AND circuit 54 may generate a square wave output when the warning signal of level 1 is received from the level detecting circuit 53. It will be understood that said dividing resistor R1 may be replaced by a Zener diode, and various other electrical elements employed can be replaced by various kinds of electric means having the same function.

We claim:

1. In a camera wherein exposure information is indicated by use of light emitting means located in the viewfinder and connected with an exposure measuring means, a warning device for indicating a warning in the viewfinder by use of said light emitting means comprising a warning situation detecting means which detects a situation that needs a warning and a warning signal generating means connected with said detecting means which generates a warning signal of level 1 when a warning situation is detected by said detecting means and normally generates a signal of level 0 when a warning situation is not detected by said detecting means, a square wave generating means which constantly generates a square wave, and a logical multiplying circuit connected with the warning signal generating means and the square wave generating means to generate an output of the logical multiplication of the signal from the warning signal generating means and the square wave from the square wave generating means, said logical multiplying circuit being electrically connected with said light emitting means to intermittently deenergize the latter by the output thereof, whereby the light emitting means is intermittently deenergized at a frequency corresponding to the frequency of the square wave when the warning signal is generated from the warning signal generating means, said frequency being sufficiently low to permit the photographer viewing through the viewfinder to notice the intermittent deenergization of the light emitting means in the viewfinder.

2. A warning device as defined in claim 1 wherein a gate circuit is provided between said light emitting means and said exposure measuring means to control the light emitting means in accordance with the output of the exposure measuring means, and said logical multiplying circuit is connected with the gate circuit.

3. A warning device as defined in claim 2 wherein an A-D converter and a decoder connected with the A-D converter are connected between said exposure measuring means and said gate circuit to control the gate circuit and selectively energize a plurality of light emitting elements connected with the decoder.

4. A warning device as defined in claim 3 wherein said light emitting means comprises a plurality of light emitting elements arranged in the viewfinder and connected with said gate circuit to be selectively energized to indicate exposure information in a digital form.

5. A warning device as defined in claim 4 wherein said logical multiplying circuit is a NAND circuit and said gate circuit comprises a plurality of normally turned on gate circuits respectively connected with the light emitting elements, whereby the gate circuits are intermittently turned off with the frequency corresponding to the frequency of the square wave when a warning signal is generated from the warning signal generating means.

6. A warning device as defined in claim 1 wherein said light emitting means comprises a plurality of light emitting elements arranged in the viewfinder and connected with a decoder which is connected with said exposure measuring circuit by way of an A-D converter which converts the analogue output from the exposure measuring means to a digital output so that the light emitting elements may be selectively energized to indicate exposure information in a digital form, and said logical multiplying circuit is connected with the light emitting elements to intermittently change the potential level at one end of the light emitting elements to intermittently turn off the light emitting elements at a frequency corresponding to the frequency of the square wave.

7. A warning device as defined in claim 6 wherein said logical multiplying circuit is an AND circuit.

8. A warning device as defined in claim 1 wherein the period, the reciprocal of the frequency, of the square wave is set to be from 0.5 to 1.0 second.

* * * * *